UNITED STATES PATENT OFFICE.

WILLIAM C. BUHLES, OF ALAMEDA, CALIFORNIA.

PROCESS OF CURING OLIVES.

1,264,487.  Specification of Letters Patent.  Patented Apr. 30, 1918.

No Drawing.  Application filed February 12, 1917.  Serial No. 148,095.

*To all whom it may concern:*

Be it known that I, WILLIAM C. BUHLES, a citizen of the United States, and a resident of Alameda, county of Alameda, and State of California, have invented a certain new and useful Process of Curing Olives, of which the following is a specification.

The invention relates to a process of curing olives.

An object of the invention is to provide an olive curing process which produces an olive of finer grade and quality than is produced by processes heretofore employed.

The ripe olive as it is taken from the tree is black or dark brown in color and is very bitter and in order to make the olive palatable, this bitterness must be removed. For this reason, the olives are placed in a lye solution which penetrates the olive and counteracts and removes the bitter taste. This result should be accomplished without destroying the taste and flavor of the olive, and at the same time, leave as much oil as possible in the olive. The lye solution turns the olive to a light gray color and since the ripe olives on the tree are black or dark brown in color, the gray olives must be trated in some way to make them black or dark brown, in order that they shall be marketable. This coloring or curing of the olives has heretofore been accomplished by removing them from the lye solution and allowing them to lie exposed to the air for sufficient time to blacken them. The air oxidizes the lye-soaked olives and burns them to the desired color. This process results in an olive of inferior taste and texture and the interaction of the lye and olive oil often produces a soapy olive.

In accordance with my invention I employ a lye solution of about one-half the strength heretofore used and while this is in some ways desirable, it is in no manner essential. After the olives have been treated with the lye bath for a considerable length of time, they are removed therefrom and submerged in water or other liquid carrying oxygen. Water contains air in solution and this air cures and blackens the olives and the air or oxygen content of the water is replenished so that sufficient oxygen for completing the curing process is available. The liquid also washes the lye or a portion of it from the olives. In practice I place the olives in a tub or vat, which is then filled with liquid, so that the olives are submerged, and flow liquid, preferably water, into the vat, preferably at the bottom, and allow the excess to overlow at the top. The liquid is preferably continuously introduced so that the submerged olives are subjected to running or circulating liquid carrying oxygen and the flow or circulation of the liquid insures the presence of oxygen in the liquid which is in contact with the olives. The olives are subjected to this treatment for such length of time as is necessary to produce the dark brown or black color, after which they are treated with the usual brine solution.

I claim:

1. The process of curing olives which consists in subjecting the olives to a lye bath and subsequently subjecting them to a bath of circulating liquid.

2. The process of curing olives, which consists in subjecting the olives to a lye bath and subsequently subjecting them to a bath of flowing liquid carrying oxygen in solution.

3. The process of curing olives, which consists in subjecting the olives to a lye bath and subsequently submerging them in a circulating liquid carrying oxygen.

4. The process of curing olives, which consists in subjecting the olives to a lye bath and subsequently submerging them in a bath of flowing water.

In testimony whereof, I have hereunto set my hand at San Francisco, California, this 6th day of February, 1917.

WILLIAM C. BUHLES.

In presence of—
H. G. PROST.

Copies of this patent may be obtained for five cents each, by addressing the "Commissioner of Patents, Washington, D. C."